United States Patent [19]

Spencer et al.

[11] Patent Number: 5,426,887
[45] Date of Patent: Jun. 27, 1995

[54] SHELTER CONE FOR PROTECTING SEEDS AND SEEDLINGS

[76] Inventors: Henry A. Spencer, 8005 - 137 Street, Edmonton, Alberta, Canada, T5R 0C1; Stephen W. J. Dominy, 118 River Road, Sault Ste. Marie, Ontario, Canada, P6A 6C7; Mark Ryans, 2978 Bugle Call, St-Lazare, Quebec, Canada, J0P 1V0

[21] Appl. No.: 260,330

[22] Filed: Jun. 15, 1994

[30] Foreign Application Priority Data

Jun. 17, 1993 [CA] Canada .................................. 2098647

[51] Int. Cl.⁶ .............................................. A01G 13/02
[52] U.S. Cl. .............................................. 47/21; 47/30
[58] Field of Search .................. 47/21, 21 A, 23, 30, 47/30 OT, 28.1, 28.1 RC, 26 F

[56] References Cited

U.S. PATENT DOCUMENTS

| | | | |
|---|---|---|---|
| 1,432,339 | 10/1922 | Jones | 47/21 A |
| 1,704,801 | 3/1929 | Miller | 47/30 |
| 3,226,881 | 1/1966 | Garrett | 47/30 |
| 4,018,003 | 4/1977 | Mirecki | 47/26 |
| 4,256,046 | 3/1981 | Salvano | 47/30 |
| 4,711,051 | 12/1987 | Fujimoto | 47/21 |

FOREIGN PATENT DOCUMENTS

| | | | |
|---|---|---|---|
| 1209202 | 6/1958 | France | 47/21 A |
| 927181 | 5/1955 | Germany | 47/30 OT |
| 3023252 | 1/1982 | Germany | 47/30 |
| 322145 | 7/1957 | Switzerland | 47/30 OT |
| 15984 | of 1894 | United Kingdom | 47/30 OT |

*Primary Examiner*—Ramon S. Britts
*Assistant Examiner*—Joanne C. Downs
*Attorney, Agent, or Firm*—Terry M. Gernstein

[57] ABSTRACT

An improved, light-transmitting, plastic shelter cone or terrarium is provided for the germination of seed and growth of seedlings. The cone has a lower soil-engaging flange at its base and a vent opening at its top. The vent opening is covered with a hinged flap which is an integral part of the cone and to which seed may be secured using a water soluble adhesive. When placed in the field, the flap is pressed down into engagement with sidewall indentations which hold the flap and seed in a generally vertical orientation within the cone chamber. Stiffening ribs are formed in the cone wall, protruding outwardly and forming grooves within. Seed may be secured within a groove with water soluble adhesive. When the cone is used, rainfall will dissolve the adhesive, whereby the seed may drop to the soil below. Latching the flap ensures that it does not return to block the vent opening. Preferably, the plastic is sunlight degradable and is further colored translucent red to modify the transmitted light.

4 Claims, 2 Drawing Sheets

1

SHELTER CONE FOR PROTECTING SEEDS AND SEEDLINGS

FIELD OF THE INVENTION

This invention relates to a shelter cone for use in planting and germination of seeds and for subsequent protection of the growing plants.

BACKGROUND OF THE INVENTION

A technique of re-forestation; used particularly in northern climates such as in Scandinavia and Canada, entails placing an open-topped shelter cone of translucent, sunlight-degradable, frangible plastic onto the soil surface with a seed or seeds planted within. The advantages of the cone, such as its low cost and local climate modifying features for optimal seed germination and growth, are well known and described. For example, see U.S. Pat. No. 3,384,992, issued to H. Heffron, or a currently available commercial cone marketed under the trade mark CERKON by CERBO of Trollhattan, Sweden.

The CERKON plastic cone is typically placed on a prepared area of soil and restrained against movement by weighting the cone base flange with soil. The cone is in a open-topped frustum form, providing an upper vent opening through which seeds may be deposited. A counted number of seeds are dropped through the hole, falling to the soil surface below.

The field counting and application of a correct number of seeds into the cone are inconsistent at best. Seeding tools are used which can apply too few seeds, too many, or can damage the seed. A Technical Note publication from the Northwestern Ontario Forest Technology Development Unit, TN-01, 1989, titled Shelter Seeding Black Spruce and Jack Pine in Northwestern Ontario, by B. Campbell and W. D. Baker, extols the advantages of using plastic seed shelter cones, yet cautions:

The seeding tools are notorious for depositing too much seed, especially when seeding black spruce;

Keep extra seeding tools on hand, as many models are not durable;

Check to make sure that the seed is placed within the cone. In the case of black spruce, carpenter chalk may be added to improve visibility, although it can sometimes clog the seeding tools; and Some seeding tools tend to plug up in rainy weather.

With this background in mind, it is an object of this invention to improve on the plastic shelter cone, to eliminate the need for separate seeding tools in the field.

SUMMARY OF THE INVENTION

The present invention is an improvement of the known shelter cone comprising a hollow, light-transmitting, frangible plastic, frusta cone structure having a soil-engaging flange at its base, said cone being adapted to be placed on a soil surface to form a mini-greenhouse environment or terrarium within.

In accordance with the invention, the top of the cone is formed with a hinged flap located to extend across the vent opening. The flap preferably forms a central depression for retaining seed. A water soluble adhesive may be applied to temporarily secure the seed to the hinged flap for handling and transportation to the planting site. The cone sidewall forms inwardly extending means for securing the flap when it is pressed downwardly into the cone interior, so that the flap is retained in a generally vertical position, thereby positioning the seed to drop into the cone chamber. With the locking of the flap in the downwardly directed position, the vent opening is unblocked.

Upon the addition of water through the vent opening, such as from rainfall, the water soluble adhesive releases, dropping the seed to the soil below; the cone then remains in place to provide an environment conducive to successful germination and seedling growth.

Preferably, the cone structure is strengthened with ribs, projecting outwardly and forming grooves on the inner cone surface. Water soluble adhesive and seed may be applied to the grooves to secure the seed therein for handling and transport to the planting site. Upon the application of water, the adhesive releases the seed in the groove, permitting it to fall to the soil below.

In a more preferred aspect of the invention, the plastic may be colored a translucent red to enhance visibility and to modify the transmitted light spectrum to assist in seedling growth. It is further preferred that the plastic be sunlight-degradable, deteriorating with exposure over time, thereby permitting the seedling to easily break free of the cone when larger.

Additional advantages and aspects of the invention will become apparent in the following description.

DETAILED DESCRIPTION OF THE PREFERRED EMBODIMENT

Figure 1:
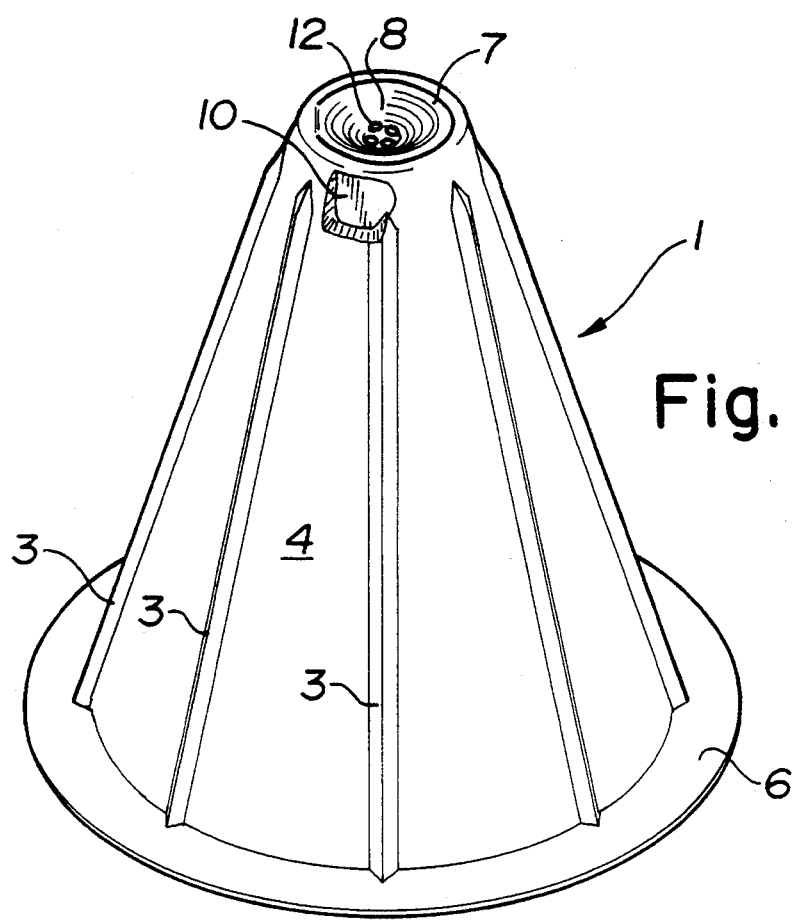
FIG. 1 presents a perspective view of the cone with the hinged flap in place for shipping.
Figure 2:
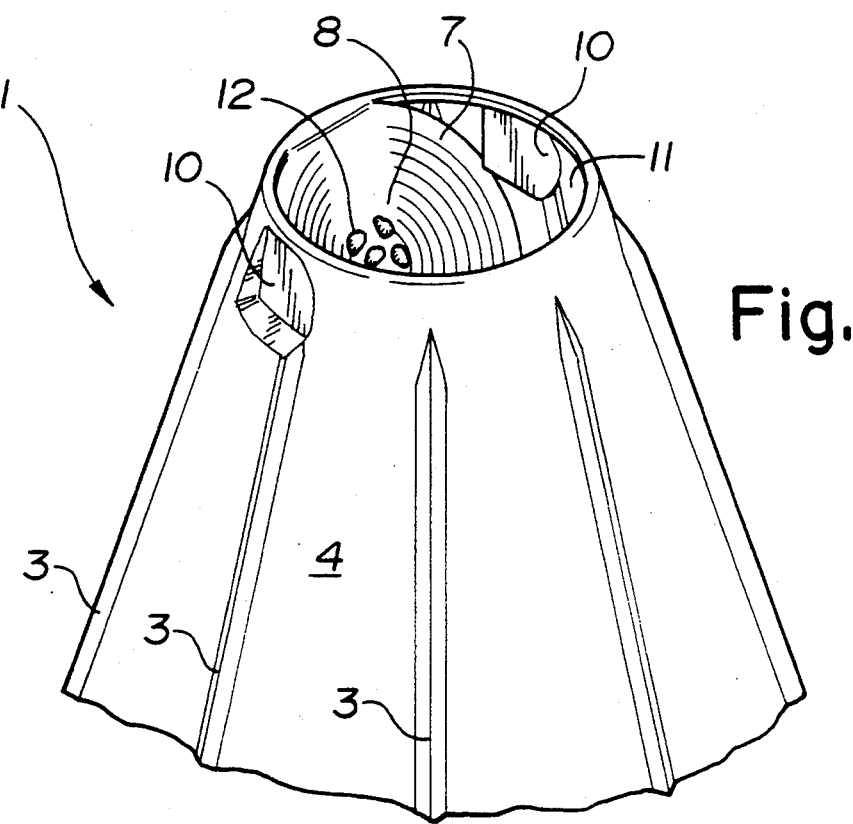
FIG. 2 presents a perspective view of the cone with the hinged flap pressed down and latched in the locked position.

Referring to FIGS. 1 and 2, the shelter cone is a hollow, thin, frangible plastic frustum of a cone forming an interior chamber 2. Suitable stiffening devices, such as ribs 3, are formed into the cone sidewall 4 to provide internal grooves 5. The base of the cone 1 has a flange 6 which may be weighted down with soil to restrain it from movement.

The plastic may be transparent or translucent to transmit light to the interior chamber 2. The cone 1 provides a climate modified environment within, like a terrarium, for optimal germination and growth of seedlings. The material and construction of such shelters is well known and practised in the art of forming thin plastic articles.

The frustum plane wall at the top of the cone 1 is formed into a hinged flap 7 having a central depression 8 formed therein.

As seen in FIG. 2, a securing means is provided for engaging the flap 7 when it is depressed, to retain it in a generally vertical position. The securing means preferably is provided in the form of two inwardly projecting indentations 10 formed into the side wall 4. The indentations 10 are adapted to engage the hinged flap 4 when it is pressed down and rotated into the interior chamber 2. The circumferential edges of the plastic hinged flap, being resilient, momentarily interfere with the indentations 10, flex and snap past, thereafter being restrained from elastically rebounding again, thereby locking the flap in a generally vertical orientation. A vent opening 11 is formed when the hinged flap 7 is displaced.

A desired one or more seeds 12 are placed into the depression 8. The seeds 12 are secured to the flap with a water soluble adhesive, such as a polyvinyl alcohol, type AIRVOL 603, available from Air Products and Chemicals Inc. This adhesive is free from materials toxic to the seed 12, is non-inhibiting to germination, and yet is sufficiently strong to temporarily hold seed in place for transport to and about the planting site.

Seeds 22 and the adhesive may be applied to cones 1 in a factory setting using mass production techniques, high volume dependable seed counting and placing apparatus, and adhesive application devices. The stacking/nesting capability of like cones is used to advantage to nest and stack seeded cones together for ease of shipping to and in the field.

Standard known techniques for successful field application are followed with respect to choosing and preparing a planting site, and weighting the base with soil. Once placed on the ground, the hinged flap 7 is pressed down into engagement with the securing means 10, orienting the flap and secured seed 12 vertically within the cone chamber 2. This may be accomplished by pressing with a finger or appropriate planting tool. All that is required at this point is the application of water through the vent opening 11, either manually by the person planting or by allowing nature to provide rainfall. The water contacts the adhesive, releasing the seed 12, which drops to the soil surface below within the cone 1, thus initiating the growing phase.

Figure 3:
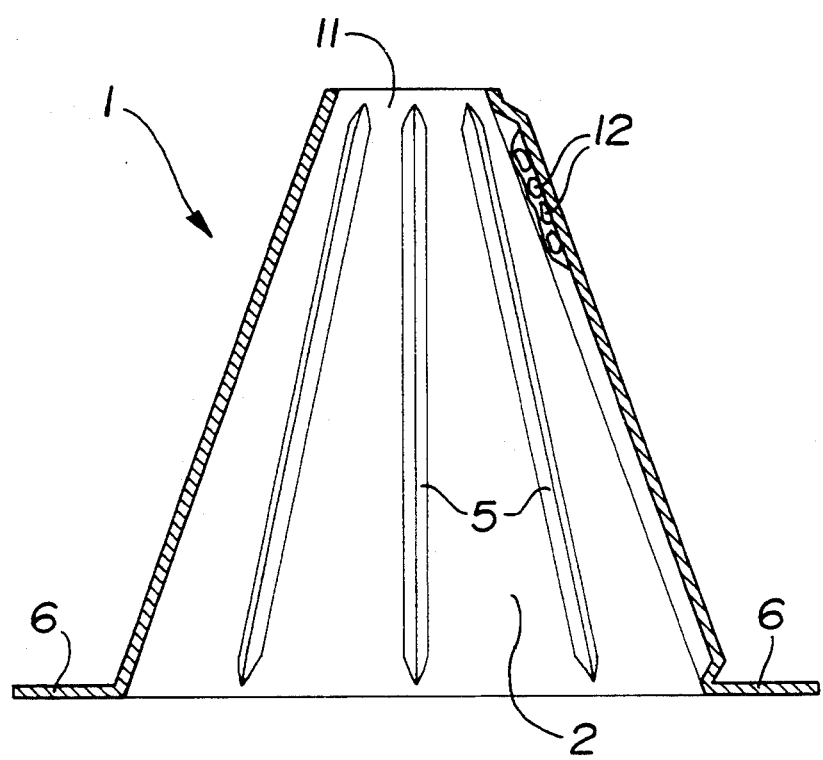
FIG. 3 presents a sectional view of an alternate embodiment, shown with exaggerated wall thickness, with the seed secured in an internal groove.

In an alternate embodiment, shown in FIG. 3, the cone 1 of the first embodiment is specifically strengthened with the inclusion of longitudinal, outwardly protruding stiffening ribs 3, providing grooves 5 internal to the side wall 4 of the cone 1. The top of the cone may be left open as a vent opening 11, having no hinged flap. A desired number of seeds 12 are secured to one or more inside groove surfaces 13 using the water soluble adhesive. The protruding ribs allow multiple stacking of like cones 1, with reduced incidence of contacting or dislodging the secured seed located within the grooves.

It is advantageous to color the plastic of the cones a translucent red, thus modifying the light transmitted through to the interior; the red spectrum being beneficial to the seedling growth. Also, to identify the location of cones for monitoring seedling growth, the red color is more easily visible by forestry personnel.

Additionally, it is preferred that the plastic used for the cone structure be sunlight degradable, thus breaking down through exposure and time, permitting the seedlings to break free and grow beyond the confines of the terrarium in an unrestricted manner.

The embodiments of the invention in which an exclusive property or privilege is claimed are defined as follows:

1. In a hollow shelter cone of frusto-conical structure forming an interior chamber and having a vent opening at its upper end, said cone having a sidewall and being formed of frangible, translucent plastic, said cone being adapted to be placed on the ground, the improvement comprising:
    a hinged flap, integral with the cone and positioned at the top of the frustum of the cone, said flap being adapted to extend substantially across the vent opening;
    means, integral with the cone sidewall, for engaging and securing the flap in a generally vertical orientation when it is rotated downwardly; and
    a seed attached by water soluble adhesive to the upper surface of the flap, whereby the seed may be freed by water running down the flap into the cone chamber and may drop into the chamber onto the ground.

2. In a hollow shelter cone of frusto-conical structure forming an interior chamber and having a vent opening at its upper end, said cone having a sidewall and being formed of frangible, translucent plastic, said cone being adapted to be placed on the ground, the improvement comprising:
    said side wall forming outwardly projecting, ribs defining grooves extending longitudinally of the sidewall, said grooves being large enough to accommodate adhered seeds; and
    a seed positioned in a groove and attached by water soluble adhesive to the sidewall, so that the seed may be freed by water running down the groove and may drop onto the ground within the chamber.

3. The improvement as set forth in claim 1 wherein the securing means comprises indentations of the sidewall.

4. The improvement as set forth in claim 3 wherein the flap forms a central depression wherein the seed is positioned.

* * * * *